(12) United States Patent
Norman (10) Patent No.: US 6,749,533 B2
(45) Date of Patent: Jun. 15, 2004

(54) GEARBOX

(75) Inventor: Robert D. Norman, Mississauga (CA)

(73) Assignee: MacDonald Dettwiler, Space and Advanced Robotics Ltd., Brampton (CA)

(*) Notice: Subject to any disclaimer, the term of this patent is extended or adjusted under 35 U.S.C. 154(b) by 0 days.

(21) Appl. No.: 10/153,600

(22) Filed: May 24, 2002

(65) Prior Publication Data

US 2003/0220169 A1 Nov. 27, 2003

(51) Int. Cl.⁷ .............................................. F16H 57/08
(52) U.S. Cl. ................................... 475/337; 74/490.05
(58) Field of Search ............................... 475/337, 346, 475/904; 74/490.01, 490.03, 490.05; 901/25

(56) References Cited

U.S. PATENT DOCUMENTS

| | | | | |
|---|---|---|---|---|
| 1,600,597 A | * | 9/1926 | Menges | 475/337 |
| 2,043,261 A | * | 6/1936 | Neuland | 475/337 |
| 2,301,497 A | * | 11/1942 | Alspaugh | 475/337 |
| 2,591,967 A | * | 4/1952 | Ridgely et al. | 475/337 |
| 3,472,081 A | * | 10/1969 | Keller et al. | 475/337 |
| 4,690,010 A | * | 9/1987 | Matsumoto et al. | 74/490.05 |

* cited by examiner

*Primary Examiner*—Dirk Wright (57) ABSTRACT

A joint may have a multi-stage planetary gearbox between the stationary housing and the rotary housing. To accommodate different gear ratios, the rotary housing may be joined to the stationary housing by a releasable attachment. This allows portions of the planetary gearbox to be replaced so that, for instance, the last stage may be chosen as either a simple or compound differential planetary stage. To allow for different capacities, a quotient of a sum of all teeth of a sun gear of a stage and of the ring gear with which the planetary gears of the stage mesh to both the number three and the number four yields an integer. In this way, the stage may be provided with either three or four planetary gears. The gearbox may have a ring gear common to a plurality of simple planetary stages. Where the final stage is a simple planetary stage, the carrier may be provided with a flange extending around, and bearing mounted to, the common ring gear. To reduce weight and increase robustness, the planetary gears of a stage are retained on their carrier by a bumper ring provided between carriers. An angle sensor may be provided between the stationary and rotary housings.

17 Claims, 5 Drawing Sheets

GEARBOX

BACKGROUND OF THE INVENTION

This invention relates to a planetary gearbox and a robotic joint having a planetary gearbox.

Designing robotic joints for harsh remote environments, such as outer space, presents a number of design challenges. For example, typically, there are strict energy budgets. Consequently, the energy requirements for a motor motivating a joint must be as small as possible. On the other hand, the portion of the robot below the joint may have a significant inertial mass so that a large torque is required to drive it according to specifications. In order to meet these conflicting design criteria, a high ratio gearbox is typically provided between the motor and the lower portion of the robot.

Because of the cost of delivering robotic components to a remote environment, these components are designed to be as small and lightweight as possible. A light weight also reduces inertial forces of the robot, in use. These requirements extend to the joint gearbox: it too should be as small and lightweight as possible. The gearbox must also be able to withstand the temperatures of the harsh environment; for space or planetary applications, this means withstanding very low, or very high, temperatures.

A robot typically has a number of joints, each powered by a motor. Each joint may have different torque and input to output ratio requirements. This suggests different gearboxes for different joints; this provides further design complexity and increased manufacturing costs.

Accordingly, a need remains for a gearbox which may provide a high capacity and a high ratio and which may be made so as to be lightweight, miniature, and robust. Such a gearbox would be suitable for use in a robot deployed in a harsh remote environment. A need also remains for such a gearbox designed to accommodate different ratios and capacities in order to minimize complexity and manufacturing cost.

SUMMARY OF INVENTION

A joint may have a multi-stage planetary gearbox between the stationary housing and the rotary housing. To accommodate different gear ratios, the rotary housing may be joined to the stationary housing by a releasable attachment. This allows portions of the planetary gearbox to be replaced so that, for instance, the last stage may be chosen as either a simple or compound differential planetary stage. To allow for different capacities, a quotient of a sum of all teeth of a sun gear of a stage and of the ring gear with which the planetary gears of the stage mesh to both the number three and the number four yields an integer. In this way, the stage may be provided with either three or four planetary gears. The gearbox may have a ring gear common to a plurality of simple planetary stages. Where the final stage is a simple planetary stage, the carrier may be provided with a flange extending around, and bearing mounted to, the common ring gear. To reduce weight and increase robustness, the planetary gears of a stage are retained on their carrier by a bumper ring provided between carriers. An angle sensor may be provided between the stationary and rotary housings.

According to the present invention, there is provided a joint comprising: a stationary housing; a rotary housing joined to said stationary housing by a releasable attachment, said releasable attachment permitting said rotary housing to rotate relative to said stationary housing; a motor carried by said stationary housing; a multi-stage planetary gearbox having a first stage sun gear motivated by said motor, said gearbox terminating at said rotary housing, such that, by releasing said releasable attachment, said rotary housing, and at least a portion of said multi-stage planetary gearbox, may be removed.

According to another aspect of the invention, there is provided a planetary gearbox having a sun gear meshing with three or four planetary gears where a quotient of a sum of all teeth of said sun gear and of a ring gear with which said planetary gears mesh to both the number three and the number four yields an integer value.

According to a further aspect of the invention, there is provided a planetary gearbox having a sun gear meshing with a given number of planetary gears where a quotient of a sum of all teeth of said sun gear and of a ring gear with which said planetary gears mesh to both of two adjacent integer values, where one of said adjacent integer values is said given number, yields an integer value.

According to another aspect of the invention, there is provided a planetary gearbox having a plurality of simple planetary stages with a common ring gear such that said common ring gear, in unison with planetary and sun gears of said gearbox, provides radial stability to said planetary and sun gears without need for an axle.

According to a further aspect of the invention, there is provided a planetary gearbox, comprising: a bumper ring extending between a first carrier for a sun gear and a second carrier for planetary gears meshing with said sun gear, said bumper ring being rotatable at least with respect to said second carrier, said bumper ring overlapping with said planetary gears in order to retain said planetary gears on said second carrier.

According to a yet further aspect of the invention, there is provided a planetary gearbox, comprising: a bumper ring overlapping with an end face of all planetary gears meshing with a single sun gear so as to retain said planetary gears.

According to a yet further aspect of the invention, there is provided a planetary gearbox having a plurality of simple planetary stages with a common ring gear, a final stage of said simple planetary stages having a carrier with a flange extending around, and bearing mounted to, said common ring gear.

Other features and advantages of the invention will become apparent to those of ordinary skill in the art upon review of the following description in conjunction with the following figures.

BRIEF DESCRIPTION OF THE DRAWINGS

In the figures which illustrate example embodiments of the invention.

DETAILED DESCRIPTION

Figure 1:
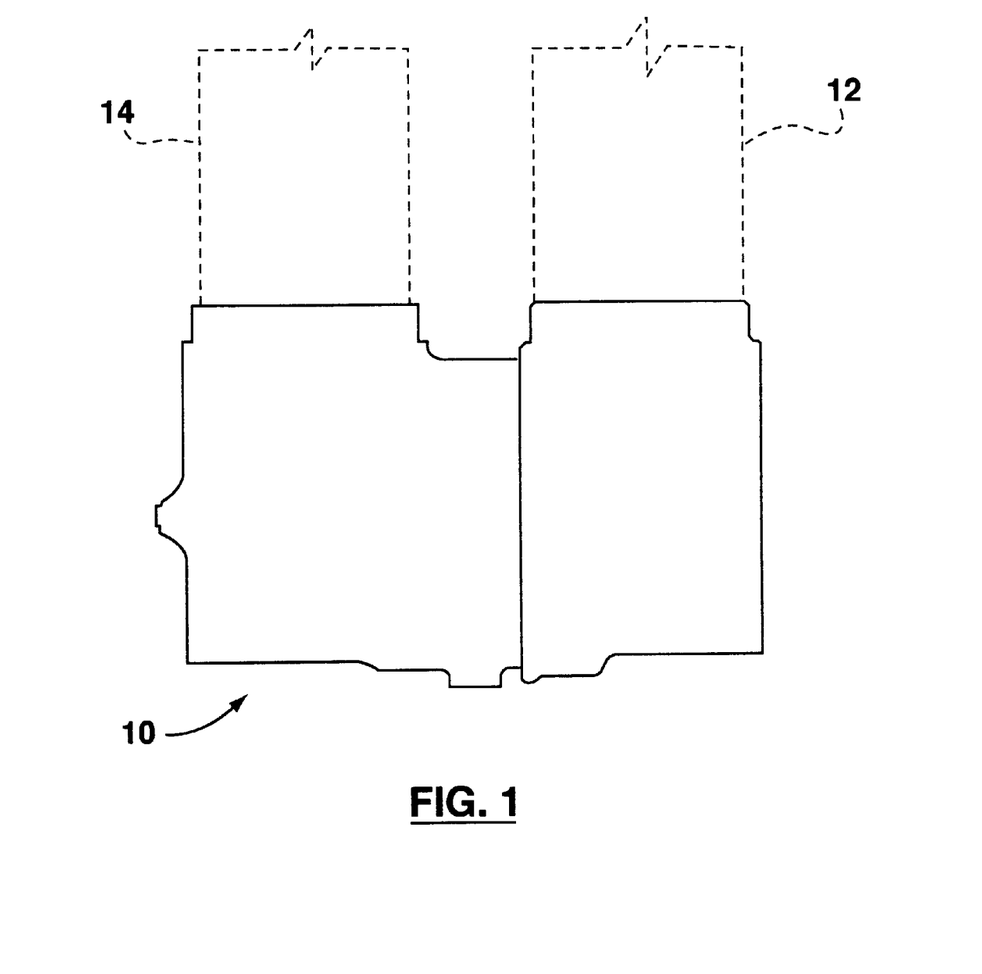
FIG. 1 is a side view of a portion of a robot having a joint with a planetary gearbox in accordance with this invention.
Figure 2:
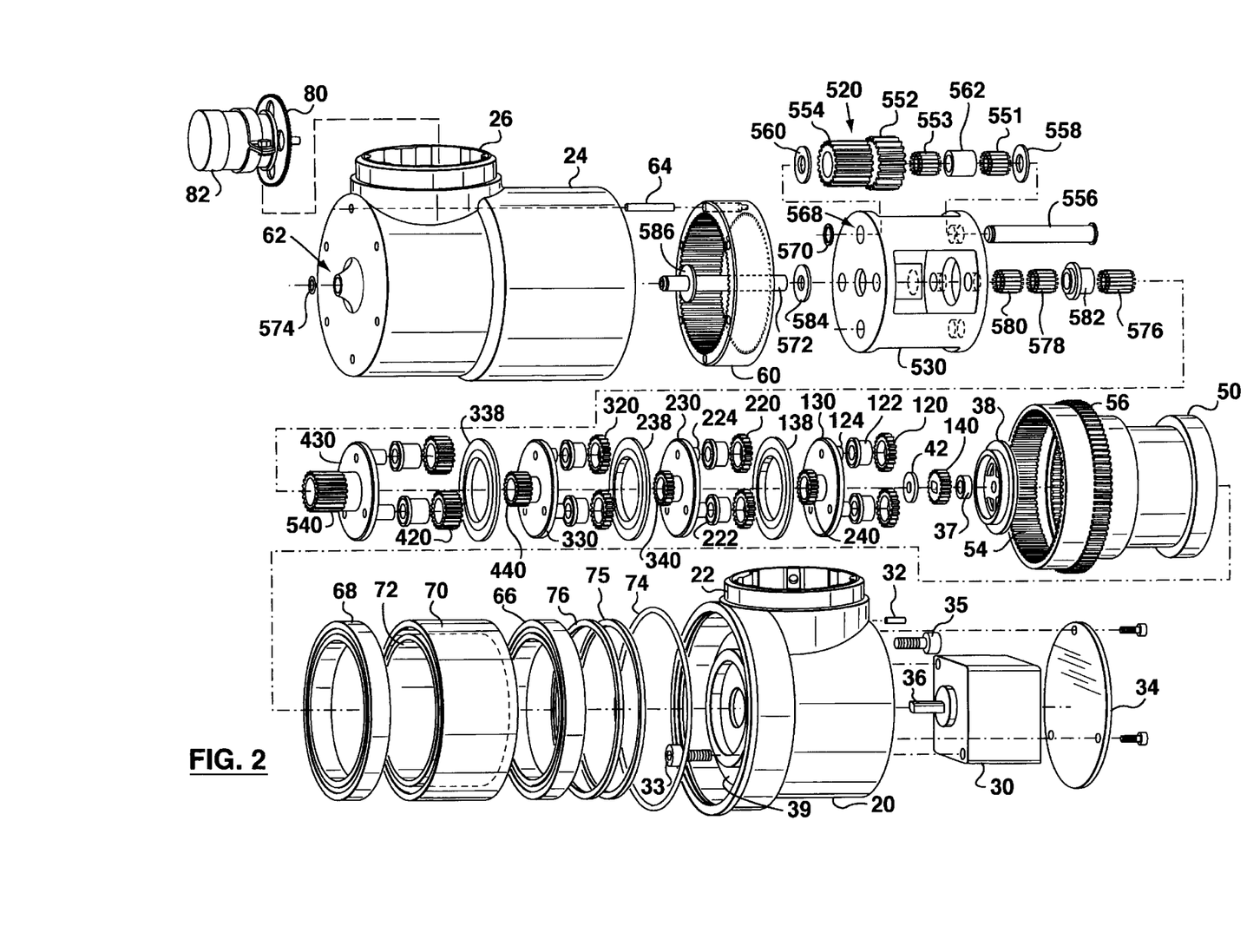
FIG. 2 is an exploded view of the robotic joint of FIG. 1.
Figure 3:
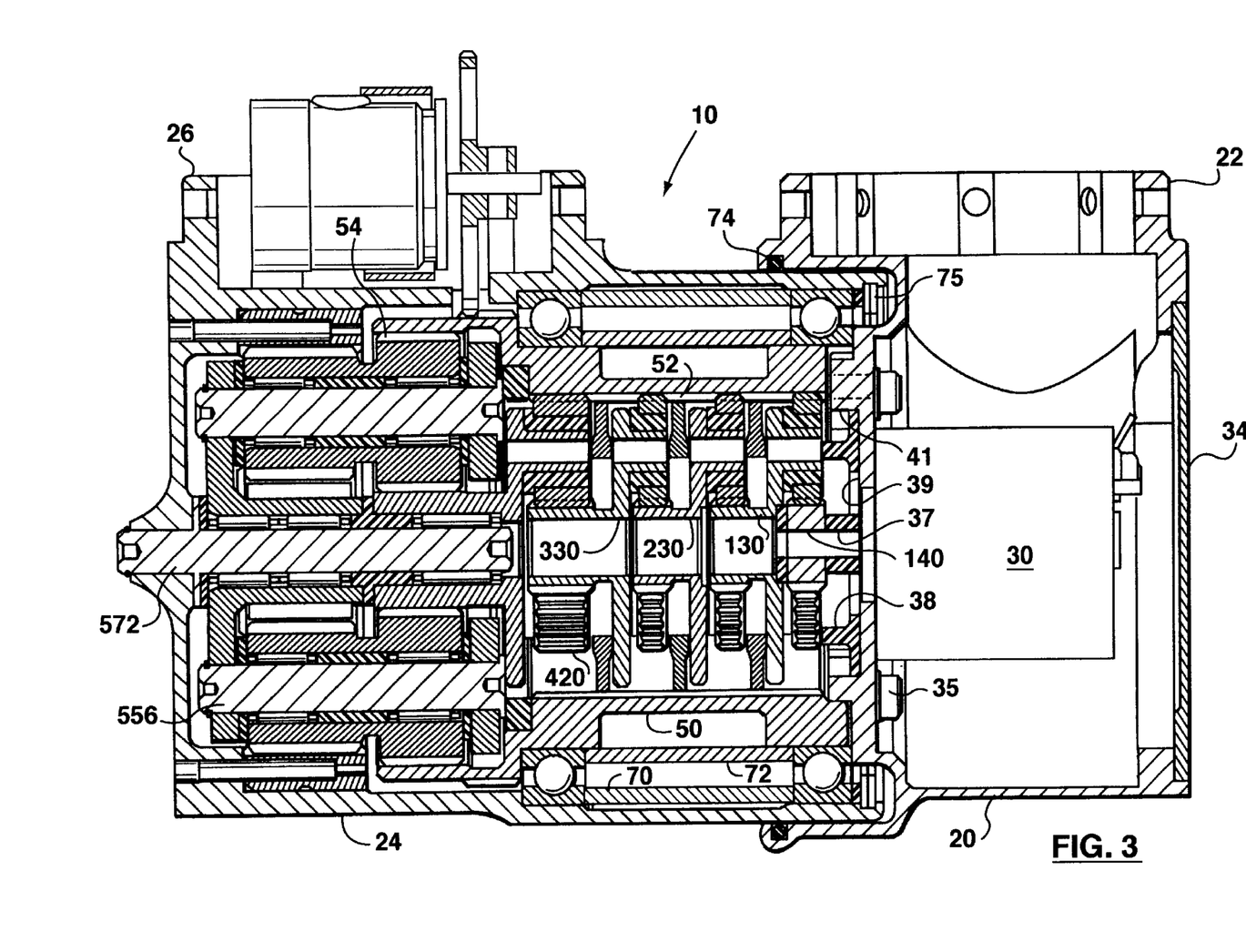
FIG. 3 is a cross-sectional view of the robotic joint of FIG. 2.

FIG. 1 shows an upper arm (or boom) 12 of a robot joined to a lower arm (or boom) 14 by a robotic joint 10. Turning to FIGS. 2 and 3, the robotic joint 10 has a stationary housing 20 with a boom-to-joint interface 22 by way of which the stationary housing is affixed to the robotic upper arm. The joint 10 also has a rotary housing 24 with a boom-to-joint interface 26 by way of which the housing is affixed to the robotic lower arm. Joint motor 30 is mounted within stationary housing 20 by way of bolts 33 which are received by the motor. An end plate 34 is mounted to the stationary housing and covers the motor.

The shaft 36 of the motor has a square cross-section; this shaft receives spacer 37, sun gear 140, and spacer 42. A bumper ring 38 surrounds the shaft. Sun gear 140 is part of the first stage of the planetary gearbox 16 and meshes with the three planetary gears 120 of the first stage. (For clarity, only two of these three gears 120 are shown.) Each of these first stage planetary gears 120 is supported by a bushing 122 on a pin 124 projecting from a first stage carrier 130. As will be apparent from FIG. 3, the bumper ring 38 abuts a face 39 of stationary housing 20 and overlaps with an end face of planetary gears 120 in order to retain the planetary gears 120 on their carrier 130. A sun gear 240 is machined on the back of the first stage carrier 130 and a bumper ring 138 surrounds sun gear 240.

Sun gear 240 is part of the second stage of the gearbox and meshes with the three planetary gears 220 of the second stage. Each of these second stage planetary gears 220 is supported by a bushing 222 on a pin 224 projecting from a second stage carrier 230. As will be apparent from FIG. 3, the bumper ring 138 overlaps with an end face of planetary gears 220. A third stage sun gear 340 extends from the back of the second stage carrier 230 and a bumper ring 238 surrounds sun gear 340.

In like fashion, the third stage sun gear 340 meshes with the third stage planetary gears 320 which are bush mounted to the third stage carrier 330. Bumper ring 238 overlaps with planetary gears 320. A sun gear 440 extends from the back of the third stage carrier and a bumper ring 338 surrounds sun gear 340.

Similarly, sun gear 440 meshes with the fourth stage planetary gears 420 which are bush mounted to the fourth stage carrier 430. Bumper ring 338 overlaps with planetary gears 420. A sun gear 540 extends from the back of the fourth stage carrier.

From the foregoing, it will be apparent that the first three stages of the planetary gearbox 16 are identical. The fourth stage is also identical except that its gears 420, 440 are longer than those of the preceding stages. Each of the first four stages is a simple planetary stage.

The fifth stage sun gear 540 extending from the back of the fourth stage carrier meshes with the larger diameter end 552 of compound differential planetary gears 520. Each of the compound differential planetary gears 520 is supported by the fifth stage carrier 530 on a pair of needle bearings 551, 553 carried by a shaft 556. The needle bearings are positioned on the shaft by washers 558, 560 and spacer 562. The shaft 556 passes through openings 568 in the ends of the carrier 530 and is held in place by a circlip 570 which attaches to a circumferential groove in the shaft. There are four compound differential planetary gears 520.

The fifth stage carrier 530 is radially supported by shaft 572 which mounts through opening 62 in rotary housing 24 and is held in place by circlip 574 which attaches to a circumferential groove in the shaft 572. The carrier rides on needle bearings 576, 578, 580 carried by the shaft 556, which needle bearings are spaced by spacer 582 washer 584, and flange 586 on shaft 572. The fifth stage is a compound differential stage.

The first four stages of the planetary gearbox 16, and a portion of the fifth stage, are received within a common annulus 50 which functions as a common ring gear. Common ring gear 50 is affixed to stationary housing 20 by dowels 32 and bolts 35. Each of the first four sets of planetary gears 120, 220, 320, and 420 meshes with the reduced diameter toothed section 52 of common ring gear 50. Further, the larger diameter end 552 of compound differential planetary gears 520 meshes with the enlarged diameter toothed section 54 of common ring gear 50.

The smaller diameter end 554 of compound differential planetary gears 520 meshes with ring gear 60. Ring gear 60 is mounted by pins 64 within rotary housing 24.

A pair of bearings 66, 68 between common ring gear 50 and rotary housing 24 supports the housing 24 for rotation on the common ring gear. The bearings 66, 68 are spaced by an outer sleeve 70 and inner sleeve 72. Sleeves 70 and 72 are compressed between the bearings 66, 68 so that the outer sleeve moves with the outer rings of the bearings and the inner sleeve moves with the inner rings of the bearings. The bearings 66, 68 are positioned by spacer 76 which butts up against a retaining ring 75. As seen in FIG. 3, the (gapped) retaining ring 75 snaps into a notch, proximate the outer lip of the rotary housing 24. A sealing gasket 74 is supported within an interior groove of stationary housing 20 and bears against the rotary housing 24.

Optionally, common ring gear 50 is provided with an externally toothed section 56 and the teeth of this externally toothed section mesh with a gear 80 of an angle sensor 82 supported within rotary housing 24. With the angle sensor carried within the rotary housing at the boom-to-joint interface 26, the joint remains streamlined.

It will be noted from the foregoing that the planetary gears of each of the first four stages are not positively mounted on their carrier. Instead, the planetary gears of a stage are kept on their bushing support by a bumper ring. For stages two to four, this ring 138, 238, 338 is positioned between the planetary gears and the carrier of the preceding stage. For the first stage, this ring 38 is positioned between the planetary gears and the face 36 of the stationary housing 20. While bumper rings 138, 238, 338 are not positively mounted, their freedom to radially shift is limited due to their outside diameter being only slightly less than the inside diameter of toothed section 52 of common ring gear 50. Thus, any such shifting would not eliminate the overlap of the bumper with the planetary gears and so is not problematic. (Bumper ring 38 is constrained from radial shifting by a lip 41 of stationary housing 20.) It will also be noted that bumper rings 138, 238, 338 are between two planetary stages and abut the rotating carrier of one stage and the more slowly circulating pins which carry the planetary gears of the next stage. The resulting tendency to wear may be resisted by an appropriate choice of material for fabrication of the bumpers and also by a low compressive force applied to the bumpers by the sandwiching carrier and pins. A suitable enduring, low-friction material for each of the bumper rings 38, 138, 238, and 338 is SP3 VESPEL (a trade-mark of DuPont).

The bumper ring may allow the planetary gears it retains a limited amount of axial freedom. However, a planetary gear which migrated toward its bumper would be stopped once the end face of the gear butted up against the bumper.

It will also be noted from the foregoing that carriers 130, 230, 330, and 430 do not ride on an axle. Instead, the common ring gear 50, in unison with the planetary gears and sun gears, provides radial stability to these carriers.

Figure 4:
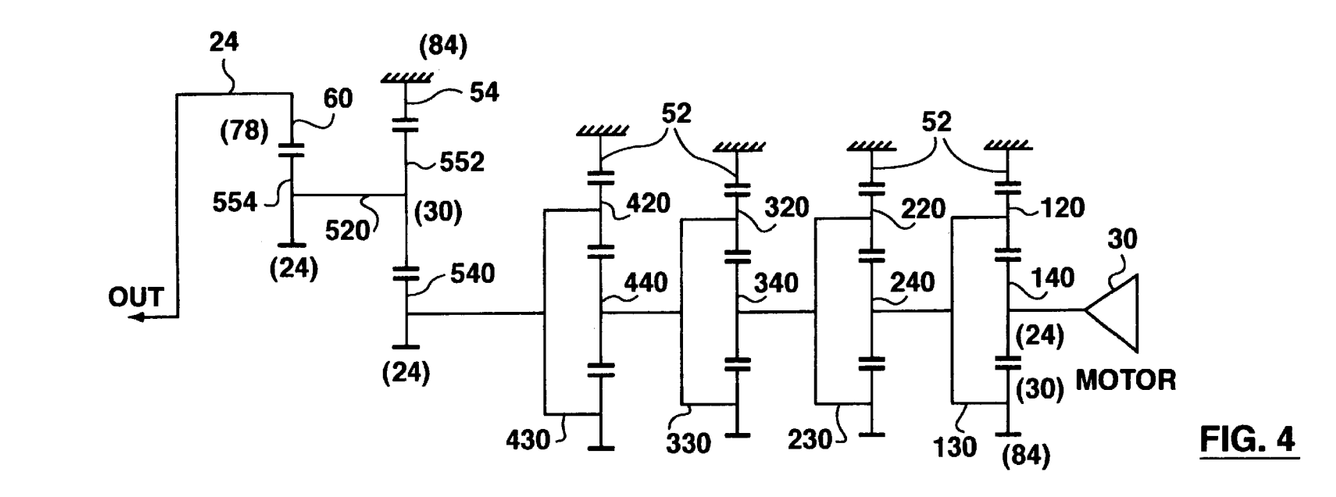
FIG. 4 is a schematic view of the robotic joint of FIG. 2.

In operation, with reference to FIG. 4 along with FIGS. 2 and 3, when motor 30, which is fixed to stationary housing 20, rotates shaft 36, sun gear 140 rotates. This causes each of planetary gears 120 to rotate about its own axis. However, since these planetary gears mesh with teeth on common ring gear 50, when each rotates on its own axis, it "walks" around the inside circumference of ring gear 50, thereby causing carrier 130 to rotate. Sun gear 240 rotates with carrier 130 and motivates the planetary gears 220 of the second stage of the gearbox to rotate and circulate. The third and fourth stages operate similarly. The sun gear 540 extending from the fourth stage carrier 430 causes the compound differential planetary gears 520 of the fifth stage to rotate about their own axes so that their larger diameter ends 552 walk around the toothed section 54 of common ring gear 50. In so doing, the smaller diameter ends 554 of the compound differential planetary gears cause ring gear 60 to rotate about its axis. However, ring gear 60 is mounted to rotary housing 24. In the result, rotary housing 24 rotates with respect to stationary housing 20. This changes the orientation of the upper arm 12 with respect to lower arm 14.

With the rotary housing rotating with respect to the stationary housing, the gear 80 of the optional angle sensor 82 carried by rotary housing 24 will rotate as the gear 80 walks around the optional toothed section 56 of common ring gear 50. In consequence, the angle sensor may provide an indication of the angular position of the rotary housing 24 with respect to the stationary housing 20.

As is well understood by those skilled in the art, each of the planetary gears of a given stage has an identical number of teeth. Each stage of the planetary gearbox has a carrier rotating at a lower speed and at a higher torque than the previous stage which is closer to motor 30. As is well understood by those skilled in the art, the gear ratio provided by a simple planetary stage is a function of the number of teeth on the sun gear of the stage and the number of teeth of the ring gear for the stage. Also as well understood by those skilled in the art, the gear ratio provided by a compound differential planetary stage is a function of the number of teeth on the sun gear of the stage, the number of teeth of each of the two ring gears for the stage, and the number of teeth at each end of the planetary gears for the stage.

The planetary gearbox 16 has been described with each of the first four simple planetary stages having three planetary gears and the fifth, compound differential stage, having four planetary gears. For the gears of a (simple or compound) planetary stage to mesh properly, the sum of the number of teeth of the sun gear plus the number of teeth of the ring gear divided by the number of planetary gears of the stage must yield an integer.

With the subject gearbox 16, the noted sum is chosen so that an integer value results where the number of planetary gears is either three or four. Thus, the number of planetary gears for any of the stages may be chosen at either three or four. The fourth planetary gear in a stage increases the capacity of the stage, but at the cost of a higher weight and greater inertia for the gearbox. Because of the lower torques in the first stages of the gearbox, it is normally only necessary to consider a fourth planetary gear for the fifth stage, or for the fourth and fifth stages of the gearbox.

It will be appreciated that by simply removing retaining ring 75 from the notch in rotary housing 24, rotary housing 24 may be axially slid off. Thus, the retaining ring acts as a releasable attachment between the rotary and stationary housings. Once the rotary housing is removed, carrier 530 may be axially slid off and then, subsequently, each of carriers 430, 330, 230, and 130 may be removed in turn. This permits substitution of a different carrier holding a different number of planetary gears (e.g., a carrier holding four planetary gears rather than three planetary gears).

A suitable choice for the number of teeth for each of the sun gears 140, 240, 340, 440 of the first four stages is twenty-four. A suitable choice for the number of teeth of smaller diameter toothed section 52 of the common ring gear 50 is eighty-four. These choices set the number of teeth for each planetary gear of each of the first four stages at thirty teeth. A suitable choice for the number of teeth of sun gear 540 is also twenty-four. Additionally, a suitable choice for the number of teeth for larger diameter toothed section 54 of common ring gear 50 is also eighty-four. A suitable number of teeth for the larger diameter end 552 of compound differential planetary gear 520 is thirty and for the smaller diameter end 554 of the gear twenty-four. A suitable number of teeth for ring gear 60 is seventy-eight.

It will be appreciated that the sum of the number of teeth of the sun gear of a stage plus the number of teeth of the ring gear divided by the number of planetary gears of the stage could be chosen so as to yield an integer where the number of planetary gears is one of two other values. Usually, the sum will be chosen so that two adjacent integer values yield an integer. Thus, for example, the sum could yield an integer where the stage has either four or five planetary gears. In this way, a gearbox may be designed to have other, changeable, capacities.

Each of the planetary gears and sun gears, along with the common ring gear 50 and ring gear 60 may be fabricated of steel. Stationary housing 20 and rotary housing 24 may be fabricated of titanium or beryllium aluminum to provide a weight advantage.

Figure 5:
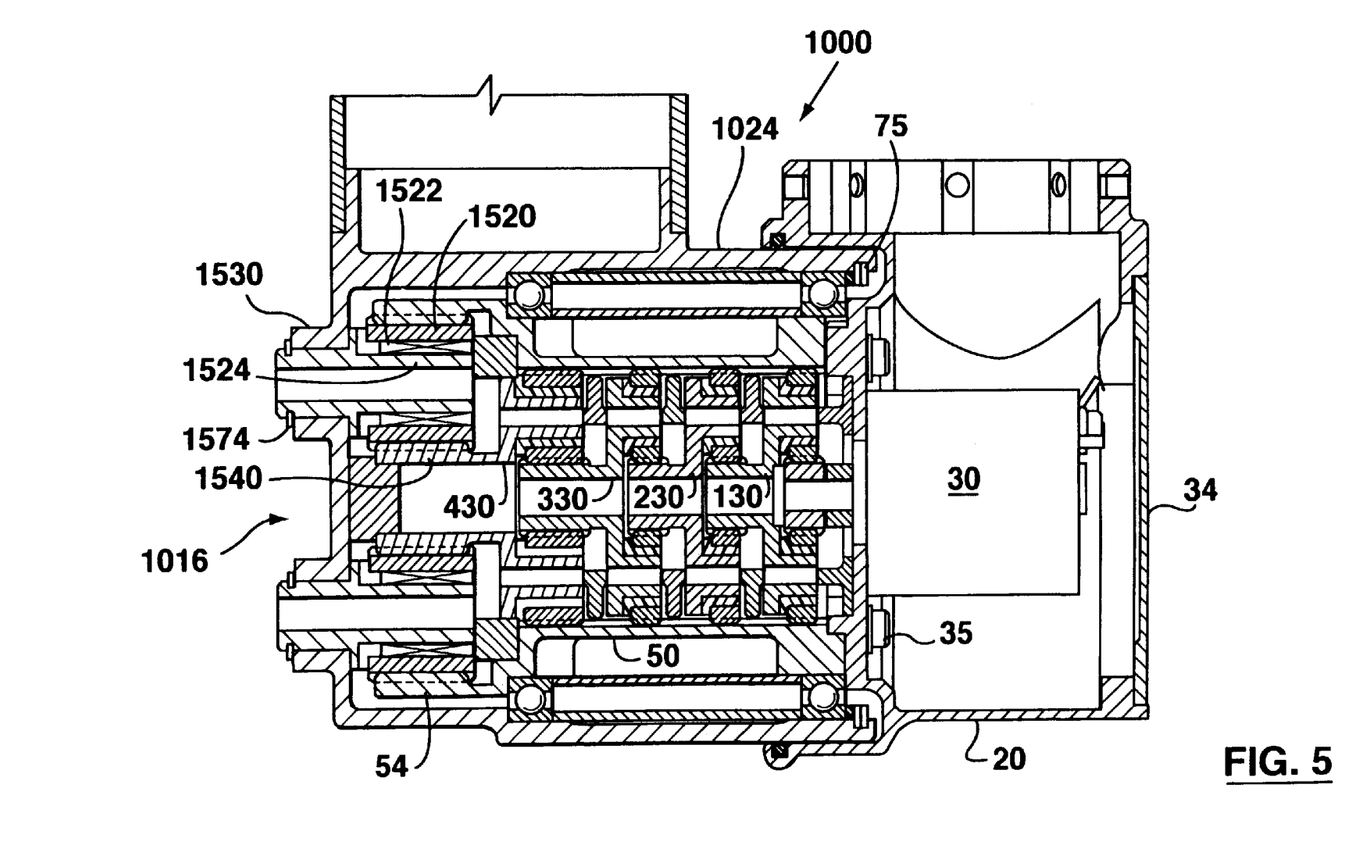
FIG. 5 is a cross-sectional view of a robotic joint according to another embodiment of this invention.
Figure 6:
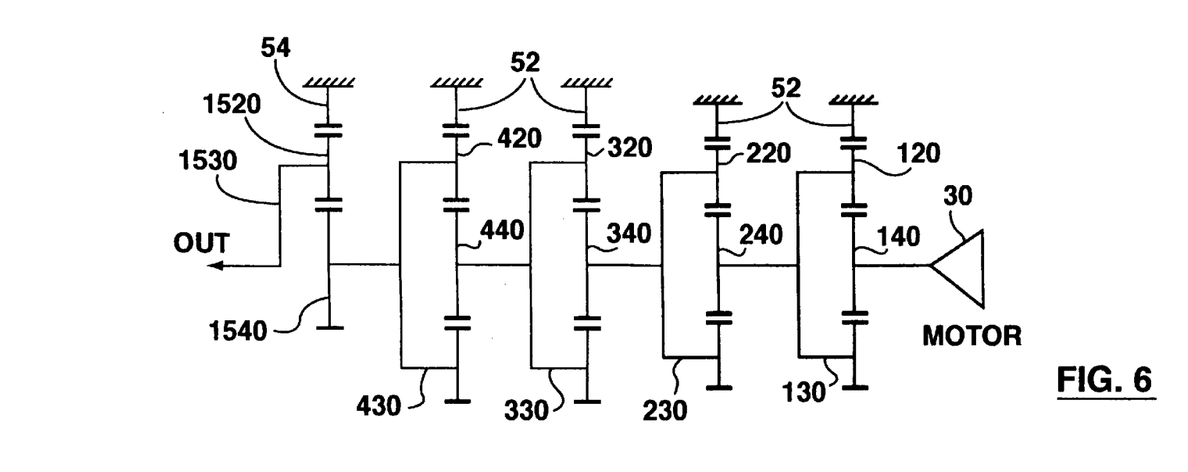
FIG. 6 is a schematic view of the robotic joint of FIG. 5.

In another embodiment, seen in FIGS. 5 and 6, the first four stages of the gearbox 1016 of joint 1000 are identical to the first four stages of the embodiment of FIGS. 1 to 4 and like parts have been given like reference numerals. The fifth stage, however, is a further simple planetary stage rather than being a compound differential stage. More particularly, a sun gear 1540 extends from the back of the carrier 430 of the fourth stage and meshes with planetary gears 1520 of the fifth stage. The fifth stage planetary gears are carried by bearings 1522 supported on pins 1524 of fifth stage carrier 1530. The fifth stage carrier has a flange 1024 which acts as the rotary housing for the joint. Thus, the fifth stage carrier does double duty as the housing, thus reducing the weight of the gearbox. The fifth stage planetary gears mesh with toothed section 54 of the common ring gear 50.

The pins 1524 are separate components from the carrier 1530 and are held to the carrier by circlips 1574.

The number of teeth chosen for the fifth stage sun gear 1540 is the same as that for the fifth stage sun gear 540 of the compound differential stage in the embodiment of FIGS. 1 to 4. In view of this, and the fact that common ring gear 50 is common to both embodiments, the fifth stage of gearbox 1016 may have either three or four planetary gears 1520.

The operation of the first four stages of the embodiment of FIGS. 5 and 6 is as described in conjunction with the first four stages of the embodiment of FIGS. 1 to 4. When the fourth stage carrier 430 of gearbox 1016 is motivated to rotate, sun gear 1540 also rotates causing planetary gears 1520 to walk around section 54 of common ring gear 50. With the planetary gears 1520 circulating, carrier 1530, with its depending flange 1024, rotates.

If retaining clip 75 is removed, carrier 1530 may be axially slid off. This allows progressive disassembly of the gearbox 1016 so that a different carrier with a different number of planetary gears may be substituted in any of the stages. Furthermore, by removing the simple planetary fifth stage, the compound differential planetary fifth stage of FIGS. 1 to 4 may be substituted. This then allows for manufacture of a gearbox which has a common input end and one of two output ends thereby reducing the manufacturing cost for two different gearboxes. In this regard, as will be apparent from the foregoing, the gearbox when provided with a compound differential last stage will have a higher ratio than when provided with a simple planetary last stage. Thus, the gearbox 16 will be used in higher torque applications. Typically, gearbox 16 will be used in a joint (such as a shoulder joint) where the portion of the robot below the joint is of a larger weight and gearbox 1016 will be used in a joint (such as a wrist joint) where the portion of the robot below the joint is of a smaller weight.

As will be apparent to those skilled in the art, gearbox 16 and gearbox 1016 are scaleable by simply changing the diametral pitch of the gears. A larger, higher torque, gearbox, or a smaller, lower torque, gearbox can therefore be manufactured as required.

While planetary gearbox 16 has been described as being part of a robotic joint, it will be apparent to those skilled in the art that the gearbox 16 will have application to a wide variety of other mechanisms requiring a gearbox.

Other modifications within the spirit of the invention will be apparent to those skilled in the art and, therefore, the invention is defined in the claims.

What is claimed is:

1. A joint comprising:
    a stationary housing;
    a rotary housing joined to said stationary housing by a releasable attachment, said releasable attachment permitting said rotary housing to rotate relative to said stationary housing;
    a motor carried by said stationary housing;
    a multi-stage planetary gearbox having a first stage sun gear motivated by said motor, said gearbox terminating at said rotary housing,
    such that, by releasing said releasable attachment, said rotary housing, and at least a portion of said multi-stage planetary gearbox, may be removed.

2. The joint of claim 1 wherein, for a plurality of stages of said multi-stage gearbox, a sun gear of one stage meshes with three or four planetary gears of said one stage, where a quotient of a sum of all teeth of said one stage sun gear and of a ring gear with which said one stage planetary gears mesh to both the number three and the number four yields an integer value.

3. The joint of claim 1 wherein a last stage of said gearbox is one of a simple planetary stage and a compound differential planetary stage and wherein stages other than said last stage are common to said gearbox when having said simple planetary last stage and when having said compound differential planetary last stage.

4. The joint of claim 1 wherein said gearbox has a ring gear which is common to a plurality of stages.

5. The joint of claim 1 wherein said gearbox has a common annular element with one or more toothed sections providing a ring gear for a plurality of stages of said multi-stage gearbox such that said annular element, in unison with planetary and sun gears of said gearbox, provides radial stability to said planetary and sun gears without need for an axle.

6. The joint of claim 1 further comprising a bumper ring extending between a cater for one stage of said gearbox and an adjacent carrier for a next stage of said gearbox, said bumper ring being rotatable at least with respect to said next stage carrier, said bumper ring overlapping with planetary gears of said next stage in order to retain said planetary gears on said next stage carrier.

7. The joint of claim 1 wherein said multi-stage planetary gearbox comprises simple planetary stages and wherein said rotary housing is a cater for planetary gears of a last stage of said gearbox.

8. The joint of claim 1 wherein stages of said multi-stage planetary gearbox comprise simple planetary stages and wherein a last stage of said gearbox is a compound differential planetary stage, an output ring gear of which moves with said rotary housing.

9. The joint of claim 8 wherein, for each stage of said multi-stage gearbox, a sun gear of one stage meshes with three or four planetary gears of said one stage, where a quotient of a sum of all teeth of said one stage sun gear and of a ring gear with which said one stage planetary gears mesh to both the number three and the number four yields an integer value.

10. The joint of claim 1 wherein said releasable attachment comprises a gapped ring releasably fitted to one of said rotary housing and said stationary housing.

11. The joint of claim 1 further comprising an angle sensor mounted between said stationary housing and said rotary housing.

12. The joint of claim 11 wherein said angle sensor comprises a tooted clement joined to one of said stationary housing and said rotary housing and a sensing member joined to another of said stationary housing and said rotary housing, said sensing member having a gear meshing with said toothed element.

13. The joint of claim 1 wherein, for a plurality of stages of said multi-stage gearbox, a sun gear of one stage meshes with a given number of planetary gears of said one stage, where a quotient of a sum of all teeth of said one stage sun gear and of a ring gear with which said one stage planetary gears mesh to both of two adjacent integer values, where one of said adjacent integer values is said given number, yields an integer value.

14. A planetary gearbox having a plurality of simple planetary stages with a common ring gear such that said common ring gear, in unison with planetary and sun gears of said gearbox, provides radial stability to said planetary and sun gears without need for an axle, wherein a final stage of said simple planetary stages has a carrier with a flange extending around, and bearing mounted to, said common ring gear.

15. A planetary gearbox, comprising:
    a bumper ring extending between a first carrier for a sun gear and a second carrier for planetary gears meshing with said sun gear, said bumper ring being rotatable at least with respect to said second carrier, said bumper ring overlapping with said planetary gears in order to retain said planetary gears on said second carrier;
    wherein each of said planetary gears is supported on a bushing;
    each said bearing is mounted on a projecting pin of said second carrier;

said planetary gears comprise second planetary gears and further comprising first planetary gears supported by said first carrier on a side of said first carrier opposite said sun gear and further comprising a ring gear common to said first planetary gears and said second planetary gears; and said second carrier extends around at least a portion of said cowman ring gear so as to provide a rotary housing which rotates relative to said common ring gear.

16. The planetary gearbox of claim 15 wherein said rotary housing is bearing mounted to said common ring gear.

17. A planetary gearbox having a plurality of simple planetary stages with a common ring gear, a final stage of said simple planetary stages having a carrier with a flange extending around, and bearing mounted to, said common ring gear.

* * * * *

UNITED STATES PATENT AND TRADEMARK OFFICE
CERTIFICATE OF CORRECTION

PATENT NO. : 6,749,533 B2
DATED : June 15, 2004
INVENTOR(S) : Robert D. Brown

It is certified that error appears in the above-identified patent and that said Letters Patent is hereby corrected as shown below:

<u>Column 8,</u>
Line 4, replace "between a cater" with -- between a carrier --;
Line 12, replace "housing is a cater" with -- housing is a carrier --;
Line 33, replace "a tooted element" with -- a toothed element --.

<u>Column 9,</u>
Line 8, replace "said cowman ring" with -- said common ring --.

Signed and Sealed this

Fourth Day of April, 2006

JON W. DUDAS
*Director of the United States Patent and Trademark Office*